F. W. BARNES & E. C. ALLEN.
TWO COLOR PICTURE CAMERA.
APPLICATION FILED NOV. 3, 1916.
1,298,641.
Patented Apr. 1, 1919.
3 SHEETS—SHEET 1.
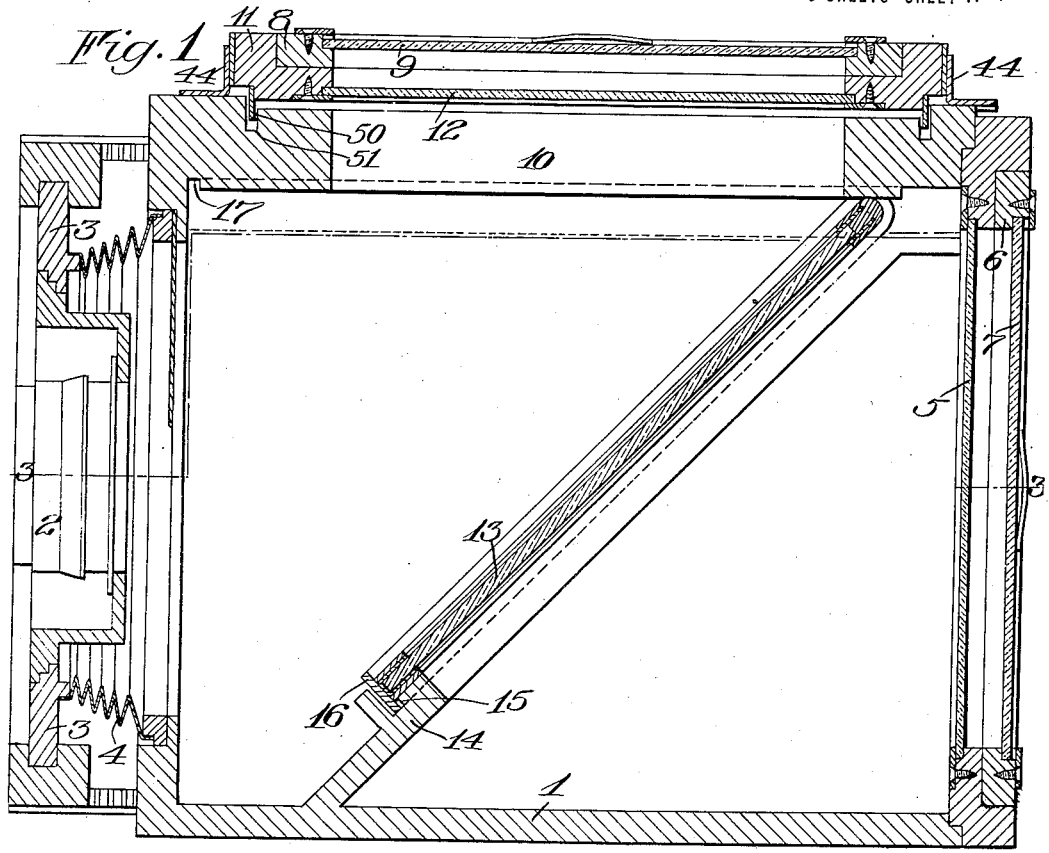
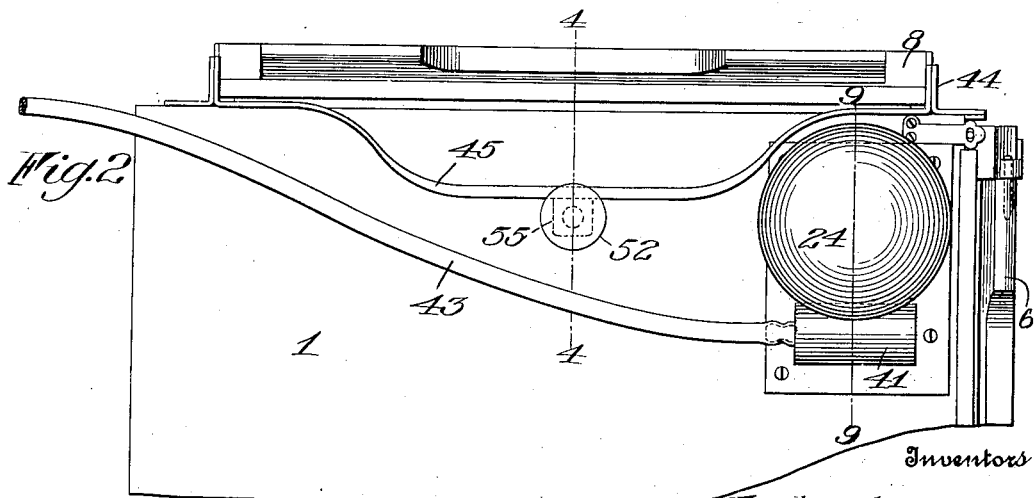
Witnesses
Walter B Payne
Inventors
Frederick W. Barnes
Ernest C. Allen
By Church Rich
their Attorneys

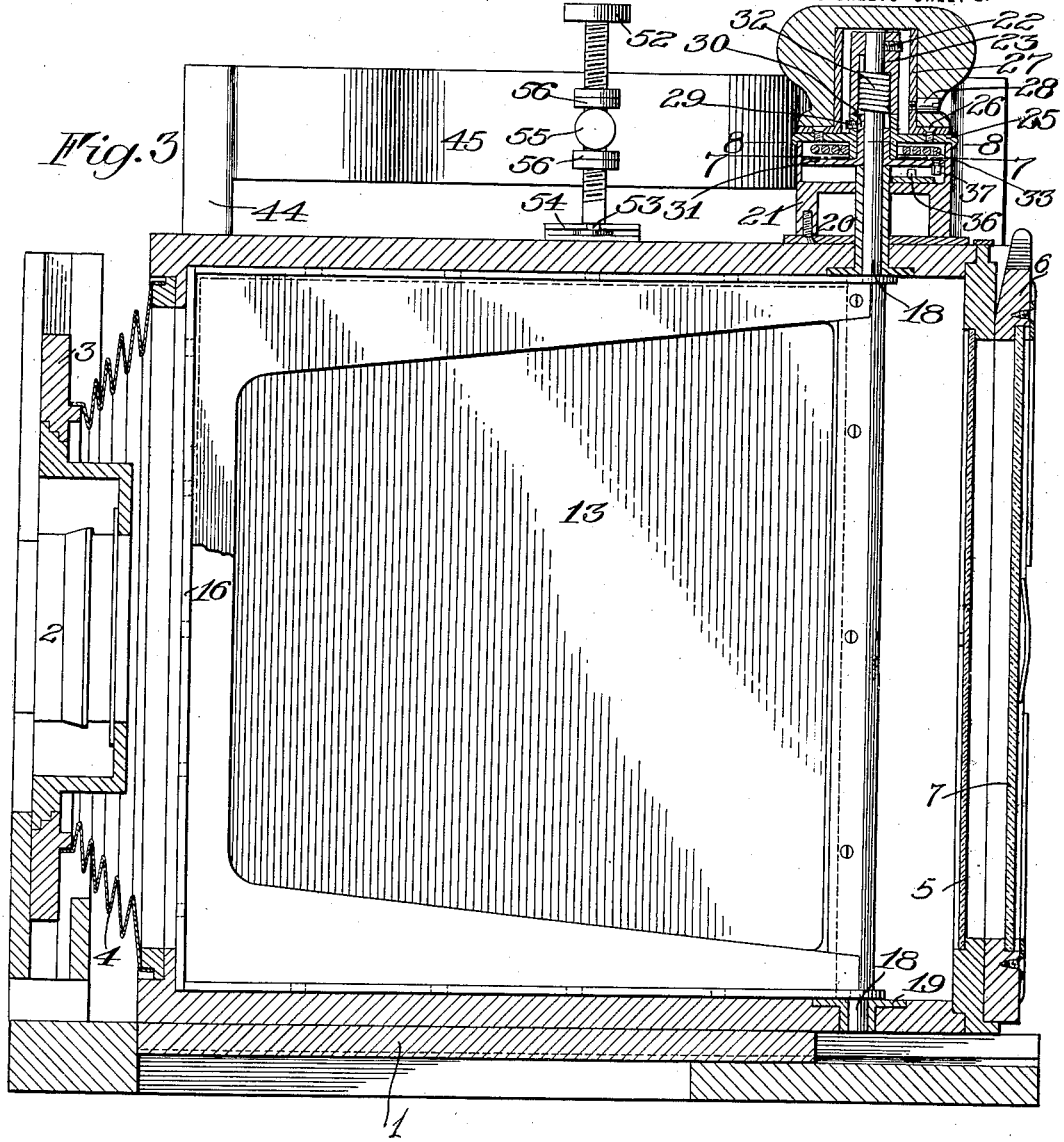

F. W. BARNES & E. C. ALLEN.
TWO COLOR PICTURE CAMERA.
APPLICATION FILED NOV. 3, 1916.
1,298,641.
Patented Apr. 1, 1919.
3 SHEETS—SHEET 3.
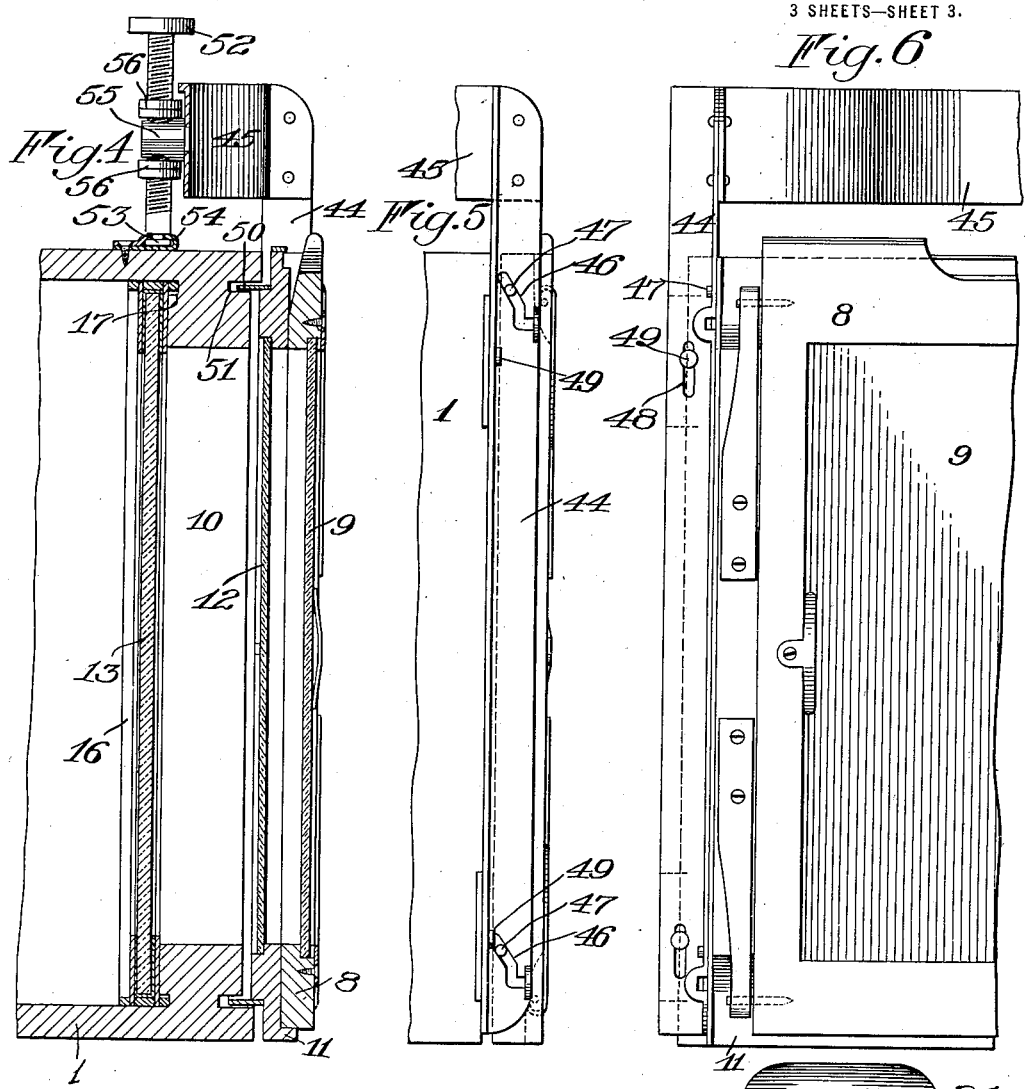
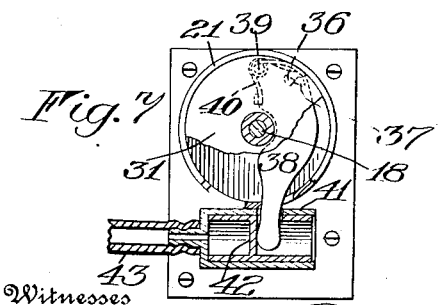
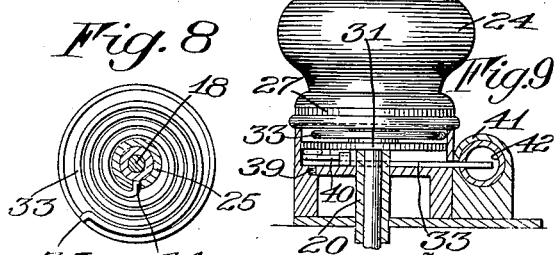
Inventors
Frederick W. Barnes
Ernest C. Allen

UNITED STATES PATENT OFFICE.

FREDERICK W. BARNES AND ERNEST C. ALLEN, OF ROCHESTER, NEW YORK, ASSIGNORS TO EASTMAN KODAK COMPANY, OF ROCHESTER, NEW YORK, A CORPORATION OF NEW YORK.

TWO-COLOR-PICTURE CAMERA.

1,298,641.  Specification of Letters Patent.  Patented Apr. 1, 1919.

Application filed November 3, 1916. Serial No. 129,265.

*To all whom it may concern:*

Be it known that we, FREDERICK W. BARNES and ERNEST C. ALLEN, of Rochester, in the county of Monroe and State of New York, have invented certain new and useful Improvements in Two-Color-Picture Cameras; and we do hereby declare the following to be a full, clear, and exact description of the same, reference being had to the accompanying drawings, forming a part of this specification, and to the reference-numerals marked thereon.

Our present invention relates to photography and more particularly to photographic cameras and it has for its object to provide a camera especially adapted for use in color photography where it is required to take a plurality of identical pictures or negatives constituting different color sensation records of the same object or subject. The invention contemplates the exposure of two plates in the same camera and through the same lens in rapid succession and the improvements are directed in part toward the provision of simple, convenient and efficient means for directing the same rays of light with identically the same focus upon first one plate and then the other. To these and other ends the invention resides in certain improvements and combinations of parts all as will be hereinafter more fully described, the novel features being pointed out in the claims at the end of the specification.

In the drawings:

Figure 1 is a horizontal central section through a two-color picture camera constructed in accordance with and illustrating one embodiment of the invention;

Fig. 2 is a fragmentary top plan view of the same;

Fig. 3 is a vertical section taken substantially on the line 3—3 of Fig. 1;

Fig. 4 is a fragmentary section taken substantially on the line 4—4 of Fig. 3;

Fig. 5 is a fragmentary view from one side of the camera showing the adjustable plate holder in side elevation;

Fig. 6 is a fragmentary elevation of the same plate holder;

Fig. 7 is a detail section taken substantially on the line 7—7 of Fig. 3;

Fig. 8 is a detail section taken substantially on the line 8—8 of Fig. 3, and

Fig. 9 is a detail section taken substantially on the line 9—9 of Fig. 2.

Similar reference numerals throughout the several figures indicate the same parts.

The camera of our invention is adapted to a process of color photography in which the same image is cast upon each of two sensitive plates but through color filters of different character, say one of red and the other green, thus obtaining different color sensation records of the same subject. The negatives are thereafter so treated that they will respectively absorb red and green dye in the proper proportions and at the proper points and, because of the complementary nature of the colors, produce a realistic effect as to the colors of the subject photographed when superposed in exact register and viewed by transmitted light. In superposing the negatives, it is desirable that they be placed film to film in order to get intimate register, in which case it is necessary that one of the images be reversed on the plate. The camera about to be described effects a reversal of one negative while producing negative images that are identical except as to color value.

Referring more particularly to the drawings, and first to Fig. 1 thereof, 1 indicates a camera body or casing having a lens tube 2 mounted on a front 3 connected by a bellows 4 to the casing for focusing movement, all as usual. In the rear wall of the camera in line with the axis of the lens is placed a glass or other green color filter 5 in front of a frame 6 provided with a focusing screen 7. The plate holding accommodations may be of the usual or any preferred form, the usual construction being herein shown, in which the frame 6 is yielding and is displaced so that the plate in its plate holder will occupy the former position of the focusing screen when the plate holder is inserted between the frame 6 and the camera body. On a side of the casing at right angles to the axis of the lens 2 is arranged another similar frame 8 having a focusing screen 9 exposed to the interior of the camera through an opening 10 in the wall thereof. For reasons that will later appear, the frame 8 is not carried directly by the casing wall but by an intermediate frame 11 in which is mounted also a red color filter 12 on the inner side of the focusing screen and its frame.

A swinging mirror 13 is mounted within the casing to operate in the angle between the plate holders and between the angular position shown in Fig. 1 in which it is 45° to the axis of the lens and to the plane of a plate in the plate holder 8 and the position of Fig. 3 in which it is parallel with the side of the casing to close the opening 10 therein. In its first mentioned position, it occupies a seat 14 disposed diagonally across the interior of the casing and having a light lock groove 15 to accommodate the flanged mirror frame 16, while in its last mentioned position, the seat is against the side wall of the casing which is likewise provided with a light lock groove 17.

The first picture is taken on the plate in the frame 8 through the red filter 12 by opening the lens while the mirror 13 is angularly disposed against the seat 14. The image is reflected from the mirror onto the plate and thereby reversed while the mirror acts as a shield for the plate and the other frame 6 and prevents any light from gaining access thereto. Immediately upon the conclusion of the exposure, the mirror is shifted to its other position to protect the plate just exposed as in Fig. 3, whereupon the next opening of the lens causes the same image to be cast on the plate held by the frame 6. Upon resetting the mirror to the position of Fig. 1, the camera is again ready. The camera is so constructed that the distance from the points of incidence of the rays cast by the lens on mirror 13 to the sensitive element in holder 8 are the same as the distances from the same points to the sensitive element in the frame 6 and therefore the images, except for reversal, are identical as recorded on the two plates or films and they will fall into perfect register when the negatives are superposed.

For the reasons just pointed out, it is important that the mirror should be held closely against its seat 14 when in the inclined position so that it will assume the same definite relationship to the sensitive material each time. It is also important that the mirror should shift quickly from one position to the other so that the smallest possible interval of time may elapse between the two exposures, particularly when a living subject is being photographed. In view of these considerations, we arrange to hold the mirror against the seat 14 by spring pressure and also actuate it to its inoperative position by a spring under the control of a tripping device of a convenient kind and the mechanism that accomplishes these results is as follows:

Referring more particularly to Fig. 3, the mirror frame 16 is carried on a shaft 18 journaled in fixed bearings 19 and 20 in the casing 1. It extends though a cylindrical housing 21 fixed on top of the casing 1 and its extremity has fixed thereto at 22 a collar 23 within a hollow operating knob 24 to which it is only indirectly connected as will presently appear.

Below the nut 23 to turn relatively thereto is a disk 25 capping the housing 21 and secured at 26 to a bushing 27 within the knob 24 and fastened thereto by a screw 28. This disk 25 is also secured at 29 to the hub 30 of a disk 31 that is free on the shaft 18 and turns within the housing 21 against the bearing 20. A spring 32 surrounding the shaft 18 has one end anchored in the collar 23 of the latter and the other end anchored in the hub 30 of disk 31 fixed to the knob so that as the knob 24 is rotated to the left to set the mirror 13, namely, to carry it from the position of Fig. 3 to that of Fig. 1 it communicates motion to the shaft only through the medium of spring 32 which is wound under tension and retains the mirror in its seat by its spring pressure.

This same setting movement of the operating knob 24 directly winds a flat spiral spring 33 within the housing 21 that lies between the disks 25 and 31 and has its inner end connected to the former at 34, as shown in Fig. 8. The outer end of the spring 33 is anchored in the housing 21 at 35. The disk 31 that turns with the disk 25 is provided on its under side with a catch 36 that engages a stop pin 37 on a trip lever 38 pivoted at 39 (Fig. 7) to the housing 21 and held with its stop 37 in the path of the catch 36 by a spring 40. The trip 38 extends into a cylinder 41 to be engaged by a piston 42 that displaces the trip when pressure is applied to a bulb connection 43 by the operator.

From the foregoing it will be seen that the spring 33 is the main spring that operates the mirror 13 from the position of Fig. 1 to the inoperative position; that it is wound directly by the knob 24 when rotated to the left to swing the mirror down to operative position; that it is held by the catch 36 and stop 37 so that the mirror is held to fly back under the influence of the spring only when the trip 38 is displaced by means of the bulb, and that the spring 32 is so disposed that the spring 33 can turn the shaft 18 only through the medium of spring 32 which latter is put under tension with the initial setting movements of the operating knob 24. Thus, spring 32 holds the mirror 13 against seat 14 and its energy must be absorbed by spring 33 before the latter can rotate the mirror to inoperative position.

In view of the beforementioned requirement that the sensitive elements in the holder frames 6 and 8 receive absolutely identical images, we provide a very sensitive focusing mechanism for the holder 8 permitting it to be accurately adjusted with reference to the mirror 13 after the latter has been set up. This mechanism is best shown in Figs. 4 to 6 and comprises angle pieces 44 secured to the sides of the intermediate frame 11 and having their upper projecting ends connected by a cross piece 45 which is preferably bowed, as shown in Fig. 2, so as not to interfere with access to the holding frame 8. The members 44 are provided with cam slots 46 that receive pins 47 on the frame 8 and also with guide slots 48 embracing guide pins 49 on the casing 1. Thus, as the members 44 are raised or lowered, the pins 47 will slide in the guide slots 46 and carry the frame 8 outwardly from or inwardly toward the camera casing and mirror 13, light guards 50 on the frame 11 coöperating with grooves 51 in the camera casing during these movements.

The frame is moved by means of a lead screw 52 having a headed portion 53 turning in a socket bearing 54 on top of the casing 1 and coöperating with a nut 55 fixed to the cross piece 45 with lock nuts 56 on either side thereof to maintain a fixed adjustment.

A camera constructed in accordance with our invention produces very accurate results and is simple in construction and easy to manipulate while by its use, the interval of time between exposures as required in color photography can be greatly reduced.

We claim as our invention:

1. In a two-color picture camera, the combination with a casing and two holders for sensitive elements carried thereby and arranged angularly to each other, of a swinging opaque mirror in the casing operable in the angle between the holders and adapted to act, selectively, to reflect an image upon one element or to protect that element during exposure of the other element to the same image.

2. In a two-color picture camera, the combination with a casing and two holders for sensitive elements carried thereby and arranged angularly to each other, of a swinging opaque mirror in the casing operable in the angle between the holders and adapted to act, selectively, to reflect an image upon one element while protecting the other, or to expose said other element to the same image while protecting the first.

3. In a two-color picture camera, the combination with a casing and two holders for sensitive elements carried thereby and arranged angularly to each other, of a swinging mirror in the casing operable in the angle between the holders and adapted to act, selectively, to reflect an image upon one element or to protect that element during exposure of the other element to the same image, a seat for the mirror while in its first position and a spring operating to press the mirror into its seat.

4. In a two-color picture camera, the combination with a casing and two holders for sensitive elements carried thereby and arranged angularly to each other, of a swinging mirror in the casing operable in the angle between the holders and adapted to act, selectively, to reflect an image upon one element or to protect that element during exposure of the other element to the same image, a seat for the mirror while in its first position, a spring operating to press the mirror into its seat and another spring operable to swing the mirror to its other position.

5. In a two-color picture camera, the combination with a casing and two holders for sensitive elements carried thereby and arranged angularly to each other, of a swinging mirror in the casing operable in the angle between the holders and adapted to act, selectively to reflect an image upon one element or to protect that element during exposure of the other element to the same image, a seat for the mirror while in its first position, a spring operable to swing the mirror to its other position and a second spring operating to press the mirror into its seat and through the medium of which the first mentioned spring acts upon the mirror.

6. In a two-color picture camera, the combination with a casing and two holders for sensitive elements carried thereby and arranged angularly to each other, of a swinging mirror in the casing operable in the angle between the holders and adapted to act, selectively, to reflect an image upon one element or to protect that element during exposure of the other element to the same image, a seat for the mirror while in its first mentioned position, a spring operating to press the mirror into the seat, a second spring operable to swing the mirror to its other position and a common winding member for both springs.

7. In a two-color picture camera, the combination with a casing and two holders for sensitive elements carried thereby and arranged angularly to each other, of a swinging mirror in the casing operable in the angle between the holders and adapted to act, selectively, to reflect an image upon one element or to protect that element during exposure of the other element to the same image, a seat for the mirror while in its first mentioned position, an operating member for setting the mirror in such position, a spring operable to swing the mirror to its other position, said spring being placed under tension by the operating member, and a second spring also placed under tension by the operating member and operable to press the mirror to its seat.

FREDERICK W. BARNES.
ERNEST C. ALLEN.

Witnesses:
E. C. MEYER,
HELEN M. FRASER.